US006742137B1

(12) United States Patent
Frey, Jr.

(10) Patent No.: US 6,742,137 B1
(45) Date of Patent: *May 25, 2004

(54) OBJECT ORIENTED FAULT TOLERANCE

(75) Inventor: Alexander H. Frey, Jr., Wayzatta, MN (US)

(73) Assignee: Adaptec, Inc., Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/376,773

(22) Filed: Aug. 17, 1999

(51) Int. Cl.[7] .............................................. G06F 11/00
(52) U.S. Cl. ........................................ 714/6; 711/114
(58) Field of Search ................... 714/6, 15, 48, 714/49, 52, 54; 711/114

(56) References Cited

U.S. PATENT DOCUMENTS

| | | | | |
|---|---|---|---|---|
| 4,993,030 A | * | 2/1991 | Krakauer et al. ............... 714/6 |
| 5,083,264 A | * | 1/1992 | Platteter et al. ................ 714/5 |
| 5,287,500 A | * | 2/1994 | Stoppani, Jr. ................ 707/205 |
| 5,355,475 A | * | 10/1994 | Tanaka et al. ............... 707/205 |
| 5,392,244 A | * | 2/1995 | Jacobson et al. ............ 711/114 |
| 5,444,719 A | * | 8/1995 | Cox et al. .................... 714/769 |
| 5,479,653 A | * | 12/1995 | Jones ........................... 714/5 |
| 5,588,110 A | * | 12/1996 | DeKoning et al. .......... 711/156 |
| 5,657,468 A | * | 8/1997 | Stallmo et al. .............. 711/114 |
| 5,857,112 A | * | 1/1999 | Hashemi et al. ............... 710/8 |
| 5,893,919 A | * | 4/1999 | Sarkozy et al. ............. 711/114 |
| 5,960,169 A | * | 9/1999 | Styczinski ..................... 714/6 |
| 6,016,552 A | * | 1/2000 | Lee et al. ....................... 714/6 |
| 6,016,553 A | * | 1/2000 | Schneider et al. ............ 714/21 |
| 6,038,679 A | * | 3/2000 | Hanson ........................ 714/15 |
| 6,098,119 A | | 8/2000 | Surugucchi et al. |
| 6,219,814 B1 | * | 4/2001 | Coker et al. ................. 714/763 |
| 6,269,424 B1 | * | 7/2001 | Katsuragi et al. ........... 711/114 |
| 6,571,314 B1 | * | 5/2003 | Komachiya et al. ......... 711/114 |
| 2002/0059539 A1 | * | 5/2002 | Anderson .................... 164/484 |

FOREIGN PATENT DOCUMENTS

| | | | | |
|---|---|---|---|---|
| WO | WO 9812621 A1 | * | 3/1998 | ........... G06F/03/06 |
| WO | WO 99/08173 | | 2/1999 | |
| WO | WO 99/09479 | | 2/1999 | |
| WO | WO 9918507 A1 | * | 4/1999 | ........... G06F/11/08 |

* cited by examiner

Primary Examiner—Robert Beausoliel
Assistant Examiner—Gabriel L Chu
(74) Attorney, Agent, or Firm—Martine & Penilla, LLP

(57) ABSTRACT

An electronic storage system, such as a file system, may include a storage access routine to store data objects. Data objects stored in the system have an entry in an object index that may be maintained by the storage access routine. The object index includes fault tolerance metadata for each data object that specifies the fault tolerance techniques used in storing a data object, such as a particular RAID level. The fault tolerance metadata maintained for each object allows different data objects to be stored with different fault tolerance techniques on the same storage volume. Additionally, the metadata for a data object may be modified in order to store the object using different fault tolerance techniques.

16 Claims, 2 Drawing Sheets

US 6,742,137 B1

OBJECT ORIENTED FAULT TOLERANCE

BACKGROUND

The invention relates generally to file systems for computer systems, and more particularly, but not by way of limitation, to the application of fault tolerance features to the storage of computer system objects.

As information technology progresses, there is a growing need for more efficient and more reliable data storage. Many companies in the marketplace today employ computer systems (including computer networks) which utilize vast amounts of data storage space. Additionally, as corporations begin to rely increasingly on electronic data storage for record keeping, accounting, document storage, and other important business operations, data storage must be dependable.

Conventional computer systems may include fault tolerant mechanisms such as redundant arrays of independent disks (RAID) technology to compensate for hardware failures and/or to increase storage performance. RAID systems typically include several disk units that are used in conjunction to provide fault tolerant data storage at the volume level. A storage volume may be a specified partition within a single disk unit, an entire disk unit, or a collection of disk units. Various levels of RAID technology may be employed to improve performance and/or to maintain data integrity of a storage volume. For example, RAID Level 0 involves striping data objects across multiple disks. Data striping involves storing blocks of data over a series of disk units at the volume level, such that all blocks on a storage volume are divided into a series of bytes that are distributed across the series of disk units. Although data striping may allow parallel disk operations that improve performance, no redundancy is provided. RAID Level 1 allows for complete redundancy by utilizing a mirroring technique at the volume level. Data mirroring involves storing a duplicate copy of all data on a storage volume on a separate volume (the "mirror"). Although mirroring techniques typically require twice as much storage space to accommodate the mirrored data, they provide complete redundancy of a storage volume. With RAID Level 1, an array of disks is divided into two groups such that one group stores the original data while a second group stores the mirrored data. RAID Level 3 includes data striping at the volume level with an additional disk dedicated to parity data. Parity techniques involve the generation and storage of extra information bits that may be used to reconstruct lost data in the event of a storage failure. A parity block may be generated that produces information (the information constitutes the parity block) which allows the original data on a single disk to be recreated from the parity block and data on other disks. Referring to Table 1, an example of RAID Level 3 is shown such that data objects A–E are striped across disk units 1–4, by storing data blocks (e.g., A1–A4) of the data object (e.g., data object A) on different disk units. The location of a data block within an individual disk unit is arbitrary, and thus a data block may be stored at any location on a particular disk unit as shown in Table 1. All of the parity blocks P1–P5 for data objects A–E are stored on the dedicated parity disk unit 5. Each parity block may be constructed from data blocks in a parity stripe, illustrated as a row in Table 1, using any parity technique such as an exclusive OR operation (+). For example, parity block P4 may be the result of a series of exclusive OR operations with data blocks A3, E4, A1, D1 as operands such that P4=A3+E4+A1+D1. In addition, Parity blocks are computed from data blocks without regard to the particular object to which the data block belongs.

TABLE 1

RAID Level 3 Example

| | Disk Units | | | | |
|---|---|---|---|---|---|
| | 1 | 2 | 3 | 4 | 5 |
| Data block | C3 | A4 | B4 | B3 | P1 | Parity block
| | E2 | B1 | D3 | A2 | P2 |
| | D4 | C2 | C4 | E3 | P3 |
| | A3 | E4 | A1 | D1 | P4 |
| | B2 | D2 | E1 | C1 | P5 | Parity stripe for parity block P4

Another technique, RAID Level 5, involves striping of both data and parity blocks at the volume level. Data and parity striping are combined to provide increased reliability (due to the use of parity) and possibly improved access performance (due to the ability to access multiple portions of a single stored object in parallel because it is distributed across multiple disk units). RAID Level 5 is demonstrated in Table 2 with data objects A–E and parity blocks P1–P5 striped across disk units 1–5. Because RAID Level 5 does not prescribe the pattern in which parity blocks are stored, parity blocks P1–P5 may be interleaved with the series of data blocks or stored elsewhere on the disk units 1–5.

TABLE 2

RAID Level 5 Example
Disk Units

| 1 | 2 | 3 | 4 | 5 |
|---|---|---|---|---|
| C3 | A4 | P1 | B4 | B3 |
| E2 | B1 | D3 | A2 | P2 |
| D4 | C2 | C4 | P3 | E3 |
| P4 | E4 | A1 | D1 | A3 |
| B2 | P5 | E1 | C1 | D2 |

Current fault tolerance techniques such as those described above are implemented at the storage volume level, requiring the same level of fault tolerance to be applied to all data stored in a storage volume, regardless of the nature of the data. Storing data in this manner is inflexible and does not allow different fault tolerant techniques to be applied to different data objects on a single storage volume. Also, reconstructing data of an object from a failed disk unit may require retrieving data from unrelated objects which otherwise would not need to be retrieved. Thus, it would be beneficial to provide a more flexible fault tolerant computer storage system.

SUMMARY

In one embodiment the invention provides a method to store data objects in a storage medium. The method includes receiving an identifier associated with a data object and associating a fault tolerance indication with the identifier. The method also includes storing the data object in the storage medium in accordance with the fault tolerance indication. In another embodiment of the invention, a program storage device that is readable by a programmable control device includes instructions stored on the program storage device. The instructions cause the programmable control device to receive an identifier associated with a data object and associate a fault tolerance indication with the identifier. The instructions also cause the programmable control device to store the data object in a storage medium in accordance with the fault tolerance indication. In yet another embodiment, the invention provides a memory for storing data for access by a storage retrieval program. The memory includes a data structure having a plurality of entries for use by the storage retrieval program. The entries in the data structure include an object identifier to identify a stored object and a fault tolerance identifier to identify a level of fault tolerance applied to the stored object.

DETAILED DESCRIPTION

Techniques (including methods and devices) to provide electronic data storage are described. The following embodiments of the invention, described in terms of RAID-type fault tolerant techniques at the storage object level, are illustrative only and are not to be considered limiting in any respect.

Figure 1:
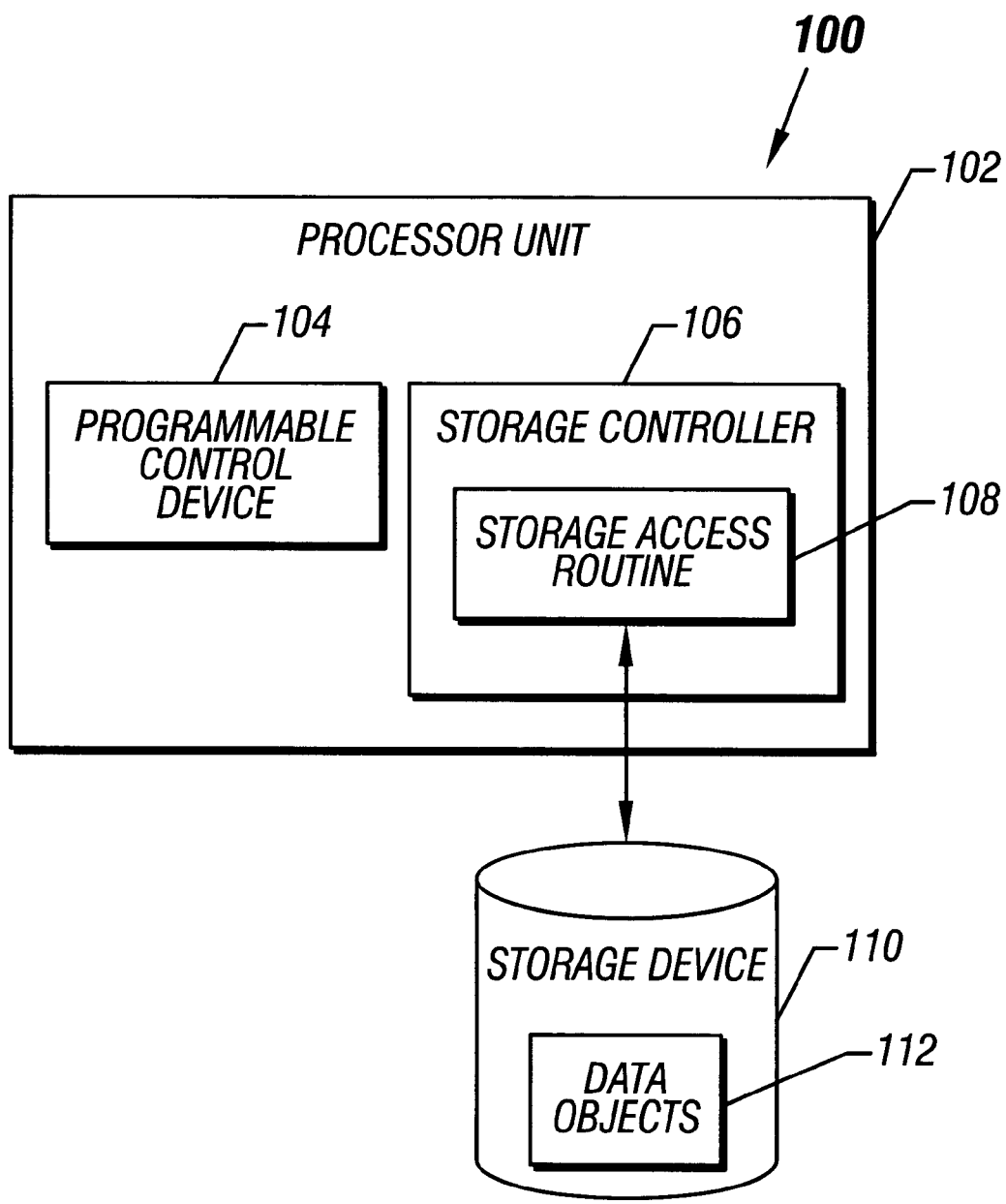
FIG. 1 shows an illustrative computer system with a storage access routine in accordance with one embodiment of the invention.

Referring to FIG. 1, an illustrative computer system 100 in accordance with one embodiment of the invention may include a processor unit 102 including a programmable control device 104 and a storage controller 106. The programmable control device 104 may be a single microprocessor or microcontroller, a plurality of processors coupled by a communications link, or a custom designed state machine. The storage controller 106 may include a storage access routine 108 to both store and retrieve data from a mass storage device 110. The mass storage device 110 may be a single magnetic or optical disk unit or may include one or more storage units in a redundant array of independent disks (RAID). A RAID device may allow for several different fault tolerance techniques, such as those previously described, to be employed in storing and retrieving data.

The storage access routine 108 may store data objects 112 on the storage media 110. The term "object" may be construed as any data that may be stored and retrieved by a memory label, such as a filename or handle. Illustrative data objects may include any type of data that a file system may store including file objects or directory objects. A file object may be a sequential array of records, such as a text file or a binary file. A directory object may be an ordered collection of records. Members of the ordered collection may be file objects or other directory objects that form subdirectories. Additionally, a data object may be a volume of data storage or even an entire file system.

Data objects 112 may be created and manipulated in the system 100 by instructions comprising the storage access routine 108. The storage access routine 108 may include instructions to create, read, write, and delete data objects. Additionally, the storage access routine 108 may maintain an object index of currently stored data objects. When a data object is created, the storage access routine 108 may include an object handle for the new data object in the object index. The object handle may be used by the storage access routine 108 to reference the data object when retrieving or modifying the data object.

The storage access routine 108 may also maintain metadata for each data object as a part of the object index. Metadata for a data object may be any type of data that describes particular characteristics of the data object, such as file type or access permissions, or indicates storage locations for portions of the data object. Metadata is usually generated by the storage access routine 108, and in some embodiments, metadata may be generated according to user input. In addition to conventional metadata that may be associated with a data object, the storage access routine 108 may maintain fault tolerance metadata for each data object. Fault tolerance metadata for a data object may include information regarding a RAID level or other fault tolerance technique to be used in storing the data object as well as indications of storage locations for fault tolerance data such as parity disk blocks or mirror disk blocks. For example, a user may create a file object and may choose data mirroring for the file object. The storage access routine may generate and assign fault tolerance metadata to the file object designating data mirroring as the fault tolerance technique for the object and providing indications of storage locations for mirror disk blocks. The user may create a second file object and choose data striping for the second file object (e.g., RAID level 3). Data striping may be indicated in the fault tolerance metadata for the second file object. Therefore, a different fault tolerance technique may be defined for each object stored in the system 100.

Figure 2:
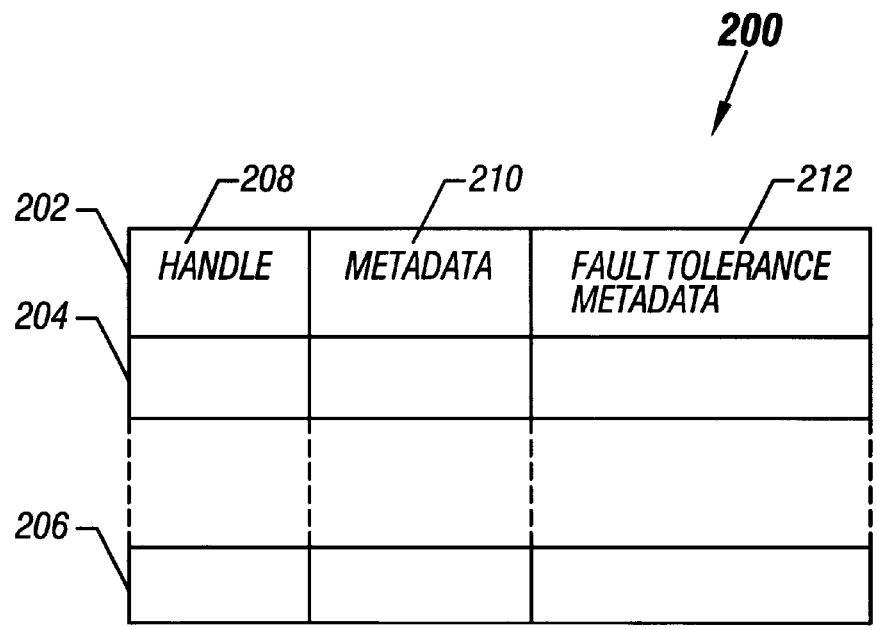
FIG. 2 shows an illustrative object index in accordance with the invention.

Referring to FIG. 2, an illustrative object index 200 includes one entry for each data object 202, 204, and 206 stored in the system 100. Each data object entry includes a handle 208 to reference the data object. A data object entry also includes conventional metadata 210 such as file type or access permissions. Additionally, a data object entry includes fault tolerance metadata 212 to specify the stored object's level of fault tolerance. The object index 200 maintains separate fault tolerance metadata 212 for each individual data object 202, 204, and 206. Also included in an object's metadata 210 may be indications of storage locations for various blocks of the data object. The fault tolerance metadata 212 may include indications of storage locations for fault tolerance data such as parity data or mirror data. The storage locations referenced by conventional metadata 210 and fault tolerance metadata 212 may be on the local system 100 or on a distal system (not shown) coupled via a communications network, such as a local area network (LAN), wide area network (WAN), or the Internet. In accordance with another embodiment of the invention, the storage access routine 108 may be one routine or a series of routines for storing objects in a distributed environment. For example, the storage access routine 108 may store only a portion of an object while another storage access routine (not shown in FIG. 1) associated with a different processor unit and/or storage controller stores another portion of the object.

Figure 3:
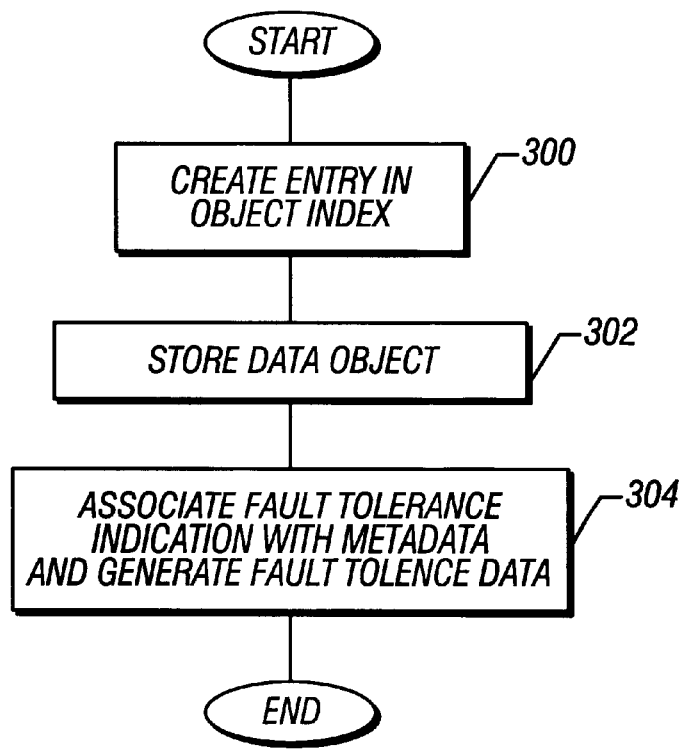
FIG. 3 shows a flow diagram for storing a data object with fault tolerance metadata in accordance with the invention.

Referring to FIG. 3, an illustrative storage access routine method is shown. Following (or in concert with) object creation, the storage access routine 108 creates an entry in the object index with the handle for the data object, at block 300. Then, at block 302, the storage access routine 108 stores the data object on the storage media 110 according to a specified fault tolerance technique. The storage access routine 108 also associates indications of the fault tolerance technique utilized with the fault tolerance metadata and generates fault tolerance data for the data object, as shown in block 304. For example, if data mirroring is specified as the fault tolerance technique for the data object, then the storage access routine 108 stores a duplicate copy of the data object on one or more additional storage devices and provides indications of storage locations for the copy in the fault tolerance metadata. In one embodiment, the storage access routine 108 may (by default or by user specification) automatically assign the highest level of fault tolerance protection to system information such as directory and object index structures. In another embodiment, all users associated with a specified account (e.g., workgroup) may have a default fault tolerance level of RAID 5, while users associated with another specified account may have a default fault tolerance level of no protection. To access the data object at a later time, the storage access routine 108 utilizes metadata to determine the physical locations of the data blocks that make up the data object. The data object may then be retrieved and/or modified by the storage access routine 108.

In addition to maintaining fault tolerance metadata for each object, the storage access routine 108 may allow the metadata for an object to be modified to accommodate different fault tolerance techniques. Meanwhile, other objects may remain stored according to the previously established level of fault tolerance. For example, Table 3 shows a series of disk units 1–5 configured to operate as a single storage medium in accordance with one embodiment of the invention. Using fault tolerance metadata, data objects D and E may be stored on the series of disk units according to RAID Level 5 as previously described. The storage access routine 108 may store the data objects D and E as series of sequential data blocks labeled D00 through D11 and E00 through E11. According to RAID Level 5, the data blocks of a data object may be striped across the series of disk units 1–5 beginning, for example, with disk unit 3. Additionally, parity blocks labeled PD0–PD2 for data object D and PE0–PE2 for data object E may be interleaved with the data blocks D and E on the series of disk units, as shown in Table 3. One parity block may be constructed for every four data blocks, such that each of the data blocks and the associated parity block are stored on separate disk units. For example, the data blocks D00 through D03 are striped across disk units 3, 4, 5, and 1 while the corresponding parity block PD0 is stored on disk unit 2. Again, in accordance with the invention, data blocks may be stored at any location on a disk unit.

TABLE 3

RAID Level 5 at the object level
Disk Units

| 1 | 2 | 3 | 4 | 5 |
|---|---|---|---|---|
|   |   | D00 | D01 | D02 |
| D03 | D04 | D05 | D06 | D07 |
| D08 | D09 | D10 | D11 | PD2 |
| PD1 | PD0 | E00 | E01 | E02 |
| E03 | E04 | E05 | E06 | E07 |
| E08 | E09 | E10 | E11 | PE2 |
| PE1 | PE0 |   |   |   |

When specifying fault tolerance techniques at the object level as shown in Table 3, fault tolerance metadata and data for the data object D may be modified to indicate a data mirroring technique, while the data object E remains stored according to RAID Level 5. In accordance with the changed fault tolerance metadata, storage access routine 108 may create a mirror of the data object D as shown in Table 4 by first creating mirror data blocks labeled PD00 to PD11 that are copies of data blocks D00 through D11 and discarding the previous parity blocks PD0 through PD2 previously stored on disk units 1, 2 and 5. The parity blocks PD00 to PD11 may be stored as a mirror of the data object D on any other suitable storage device, such as an additional series of disk units labeled 6–10. Alternatively, the parity blocks PD00 to PD11 may be stored on disk units labeled 1–5, such that the parity blocks shown on units 6, 7, 8, 9, and 10 are stored on units 2, 3, 4, 5, and 1, respectively. While the parity blocks are shown distributed across disk units 6 through 10, each parity block may in fact be stored on any disk unit that does not contain data used to compute that parity block. For example, all parity blocks may be stored on a single separate disk unit.

TABLE 4

Data mirroring at the object level

Disk Units

| 1 | 2 | 3 | 4 | 5 | 6 | 7 | 8 | 9 | 10 |
|---|---|---|---|---|---|---|---|---|----|
|   |   | D00 | D01 | D02 |   |   | PD00 | DP01 | PD02 |
| D03 | D04 | D05 | D06 | D07 | PD03 | PD04 | PD05 | PD06 | PD07 |
| D08 | D09 | D10 | D11 |   | PD08 | PD09 | PD10 | PD11 |   |
|   |   | E00 | E01 | E02 |   |   |   |   |   |
| E03 | E04 | E05 | E06 | E07 |   |   |   |   |   |
| E08 | E09 | E10 | E11 | PE2 |   |   |   |   |   |
| PE1 | PE0 |   |   |   |   |   |   |   |   |

Additionally, an object entry in the object index corresponding to the data object D may be modified to indicate data mirroring as the fault tolerant technique to be used for the object D. Therefore, the fault tolerance technique applied to data object D may be modified without moving the data blocks D00 to D1 stored on disk units 1–5 and without disturbing the storage of data object E. This is in contrast with conventional fault tolerant techniques, which, in order to change the fault tolerant technique to mirroring for a single data object D, require modification of the entire volume on which the data object D is stored. For example, if conventional fault tolerant techniques had been used to mirror data object D, then data object E would have been mirrored as well, rather than remaining stored according to RAID Level 5. In accordance with the invention, the system 100 need only construct a mirror of the single data object D and modify the object's index entry.

When retrieving an object, part of whose data has been stored on a failed storage unit with fault tolerance data constructed based on RAID Level 5 techniques, if the fault tolerance data was constructed as described herein, only data from the object being retrieved is necessary to reconstruct all of the data of that object. In contrast, with conventional Raid Level 5 techniques (as shown previously in Table 2) substantial data from other objects may be necessary in reconstructing failed portions of an object being retrieved. This considerably affects performance in this degraded mode of operation.

In each of the previous examples, fault tolerance data may include parity information in addition to mirror data or any other fault tolerance techniques. Parity information may be stored as parity blocks generated from data blocks logically arranged in parity stripes. The parity blocks may be stored in any storage location as indicated by the corresponding fault tolerance metadata.

By maintaining fault tolerance metadata for data objects, several benefits may be gained. A computer storage system in accordance with the invention allows for flexibility in the manner in which fault tolerance is provided for data in the system. Because fault tolerance techniques are specified for individual data objects, each file or directory in the system may be stored in accordance with a different fault tolerance technique. Also, by defining fault tolerance at the data object level, the fault tolerance technique utilized to store a particular data object may be modified to store the data object using another technique—without causing any other object stored on the same storage medium to be modified.

While the invention has been disclosed with respect to a limited number of embodiments, numerous modifications and variations will be appreciated by those skilled in the art. For example, the invention allows for a data object's level of fault tolerance to be modified from any initial state (e.g., no protection or RAID level 5) to any other state (e.g., no protection or RAID level 3). It is intended, therefore, that the following claims cover all such modifications and variations that may fall within the true spirit and scope of the invention.

What is claimed is:

1. A method of storing first and second data objects in a storage medium to protect each of the data objects consistent with fault tolerance techniques that are applied to each respective one of the first and second data objects, each fault tolerance technique being configured to be modified, the protecting of one of the data objects being modified when the respective applied fault tolerance technique is modified, each data object having data portions, an associated metadata object portion, an associated parity object represented by a fault tolerance metadata object, and associated fault tolerance data object portions, the method comprising the operations of:

storing a first fault tolerance technique with the associated metadata object portion of the first data object and with first associated fault tolerance metadata of the associated parity object;

providing a first set of data blocks representing the data portions of the first data object;

providing a second set of data blocks representing the data portions of the second data object; and associating a first parity block, representing a portion of a first parity object associated with the first data object, with only data blocks of the first set of data blocks representing the data portions of the first data object, to apply a first of the fault tolerance techniques to the first data object according to the first fault tolerance technique.

2. A method as recited in claim 1, the method comprising the further operation of:

associating a second parity block from a second parity object with only data blocks of the second set of data blocks representing the data portions of the second data object to apply a second of the fault tolerance techniques to the second data object according to the second fault tolerance technique.

3. A method as recited in claim 1, wherein the associating operation applies the first fault tolerance technique to the first data object by creating the first parity object having parity blocks generated by the first fault tolerance technique from the data portions of the first data object.

4. A method as recited in claim 1, the method comprising the further operations of:

receiving a first indicator associated with the first data object, the first indicator identifying a modification to be made in the first fault tolerance technique stored with the first associated metadata portion of the first data object;

modifying the first fault tolerance technique of the first data object in accordance with the first indicator; and modifying the fault tolerance data object portions for the first data object, and modifying the associated fault tolerance metadata for the first object, in accordance with the modified first fault tolerance technique.

5. A method as recited in claim 4, wherein the modifying of the fault tolerance data object portions for the first data object in accordance with the modified first fault tolerance technique creates a second parity object with a second fault tolerance metadata object representing fault tolerance data object portions taken from the group consisting of RAID 1 to RAID 6 and having data blocks representing the data portions of the first data object.

6. A method as recited in claim 5, wherein the modifying of the fault tolerance data object portions for the first data object in accordance with the modified first fault tolerance technique consists of:

creating the second parity object with the second fault tolerance metadata object in accordance with the modified first fault tolerance technique, and discarding the first parity object, the discarding being discarding of all the parity blocks of the first parity object and of the fault tolerance metadata associated with the first fault tolerance technique.

7. A program storage device, readable by a programmable control device, comprising:

instructions stored on the program storage device for causing the programmable control device to store first and second data objects in a storage medium, each of the data objects having data portions, an associated metadata object portion, an associated parity object represented by a fault tolerance metadata object, and associated fault tolerance data object portions;

the program storage device protecting each of the data objects consistent with fault tolerance techniques that are applied to each respective one of the first and second data objects, each fault tolerance technique being configured to be modified, the protecting of one of the data objects being modified when the respective applied fault tolerance technique is modified, the program storage device further comprising instructions to:

store a first fault tolerance technique with the associated metadata object portion of the first data object and with first associated fault tolerance metadata of the associated parity object of the first data object;

provide a first set of data blocks representing the data portions of the first data object;

provide a second set of data blocks representing the data portions of the second data object; and associate a first parity block, representing a portion of a first parity object associated with the first data object, with only data blocks of the first set of data blocks representing the data portions of the first data object, to apply a first of the fault tolerance techniques to the first data object according to the first fault tolerance technique.

8. A program storage device as recited in claim 7, the program storage device comprising further instructions to:

associate a second parity block from a second parity object with only data blocks of the second set of data blocks representing the data portions of the second data object to apply a second of the fault tolerance techniques to the second data object according to the second fault tolerance technique.

9. A program storage device as recited in claim 7, wherein the instruction to associate the first parity block applies the first fault tolerance technique to the first data object by creating the first parity object having parity blocks generated by the first fault tolerance technique from the data portions of the first data object.

10. A program storage device as recited in claim 7, the program storage device comprising further instructions to:

receive a first indicator associated with the first data object, the first indicator identifying a modification to be made in the first fault tolerance technique stored with the first associated metadata portion of the first data object;

modify the first fault tolerance technique of the first data object in accordance with the first indicator; and modify the fault tolerance data object portions for the first data object, and modifying the associated fault tolerance metadata for the first object, in accordance with the modified first fault tolerance technique.

11. A program storage device as recited in claim 10, wherein the instruction to modify the fault tolerance data object portions for the first data object in accordance with the modified first fault tolerance technique creates a second parity object with a second fault tolerance metadata representing fault tolerance data object portions taken from the group consisting of RAID 1 to RAID 6 and having data blocks representing the data portions of the first data object.

12. A program storage device as recited in claim 11, wherein the instruction to modify the fault tolerance data object portions for the first data object in accordance with the modified first fault tolerance technique consists of instructions to:

create the second parity object with the second fault tolerance metadata in accordance with the modified first fault tolerance technique, and discard the first parity object, the discarding being discarding of all the parity blocks of the first parity object and of the fault tolerance metadata associated with the first fault tolerance technique.

13. A method of storing first and second data objects in a storage medium to protect each of the data objects consistent with fault tolerance techniques that are applied to each respective one of the first and second data objects, each fault tolerance technique for one of the first and second data objects being configured to be modified separately from the fault tolerance technique for the respective other second and first data objects, the protecting of one of the data objects being modified when the respective applied fault tolerance technique is modified, each data object having data portions, an associated metadata object portion, associated fault tolerance metadata representing the fault tolerance technique for the respective data object, and associated fault tolerance data object portions, the method comprising the operations of:

storing a fault tolerance technique with the associated metadata object portion of the first data object and with first associated fault tolerance metadata representing the fault tolerance technique for the first data object;

providing a first set of data blocks representing the data portions of the first data object;

providing a second set of data blocks representing the data portions of the second data object;

associating a first parity block, representing the fault tolerance data object portions associated with the first data object, with only data blocks of the first set of data blocks representing the data portions of the first data object, to apply a first of the fault tolerance techniques to the first data object according to the first fault tolerance technique;

receiving a first indicator associated with the first data object, the first indicator identifying a modification to be made in only the first fault tolerance technique stored with the first associated fault tolerance metadata of the first data object;

modifying only the first fault tolerance technique of the first data object in accordance with the first indicator; and modifying only the fault tolerance data object portions for the first data object, and modifying the associated fault tolerance metadata for the first object, in accordance with the modified first fault tolerance technique.

14. A method as recited in claim 13, wherein the modifying of only the fault tolerance data object portions for the first data object, in accordance with the modified first fault tolerance technique, creates second fault tolerance metadata identifying a fault tolerance technique taken from the group consisting of RAID 1 to RAID 6, the second fault tolerance metadata having indications of fault tolerance data representing the data portions of only the first data object.

15. A method as recited in claim 13, wherein the associating operation applies the first fault tolerance technique to the first data object by creating a first parity data block representing the data portions of only the first data object.

16. A method as recited in claim 14, wherein the modifying of only the fault tolerance data object portions for the first data object in accordance with the modified first fault tolerance technique consists of:

creating second parity blocks in accordance with the modified first fault tolerance technique, and discarding the first parity block and discarding the first associated fault tolerance metadata associated with the first fault tolerance technique.

* * * * *